Figure 1:
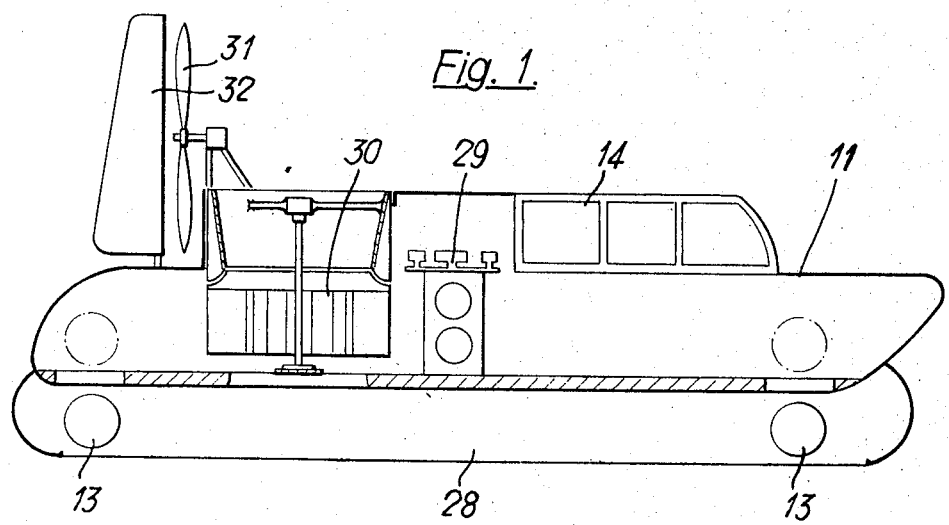

United States Patent
Morgan et al.

[11] 3,810,522
[45] May 14, 1974

[54] AIR-CUSHION SUPPORTED VEHICLES

[76] Inventors: John Roderick Cromwell Morgan, 14 The Towers, Grand Ave., Worthing, Sussex; Frederick William Albert Von Meijer, 82 Reigate Rd., Ewell, Surrey, both of England

[22] Filed: Sept. 24, 1971

[21] Appl. No.: 183,349

[30] Foreign Application Priority Data
May 13, 1971 Great Britain.................. 14804/71

[52] U.S. Cl. .............................................. 180/116
[51] Int. Cl. .............................................. B60v 1/00
[58] Field of Search ............ 180/116, 117, 118, 120

[56] References Cited
UNITED STATES PATENTS

| | | | |
|---|---|---|---|
| 3,208,543 | 9/1965 | Crowley | 180/116 |
| 3,291,242 | 12/1966 | Tinajero | 180/116 |
| 3,270,827 | 9/1966 | Mantle | 180/116 |
| 3,322,223 | 5/1967 | Bertelsen | 180/120 |
| 3,297,280 | 1/1967 | Lee | 180/116 |
| 3,231,038 | 1/1966 | Weiland | 180/116 |
| 3,662,853 | 5/1972 | Love | 180/116 |
| 3,443,659 | 5/1969 | Moore | 180/128 |

*Primary Examiner*—Gerald M. Forlenza
*Assistant Examiner*—D. W. Keen
*Attorney, Agent, or Firm*—Rose & Edell

[57] ABSTRACT

A ground effect vehicle or hovercraft has a main power plane or prime mover driving pumps from which hydrostatic circuits transmit power to individual hydraulic motors coupled, respectively, to the fan supplying air to the supporting ground cushion and to the drive propellers and other auxiliary facilities. The prime mover and principal mechanical components, as well as the control cabin of the vehicle, are built into a powered module that can be docked or mounted on any one of a number of platforms, which platforms are purpose-built for the functions the total vehicle is to perform and are provided with detachable skirts to retain the supporting air cushion.

18 Claims, 18 Drawing Figures

Inventors
JOHN RODERICK CROMWELL MORGAN
& FREDERICK WILLIAM ALBERT VON MEIJER

By
Rose & Edell  Attorneys

Inventors
JOHN RODERICK CROMWELL MORGAN
& FEDERICK WILLIAM ALBERT VON MEIJER
By
Rose & Edell   Attorneys

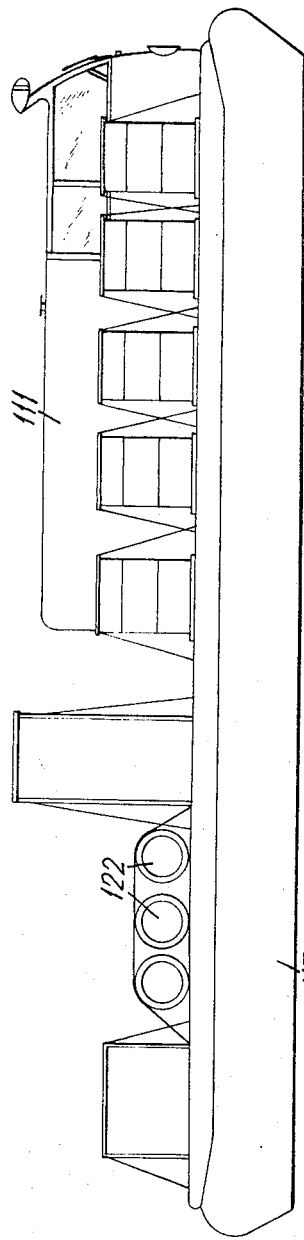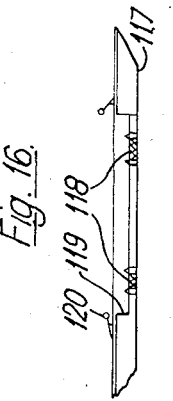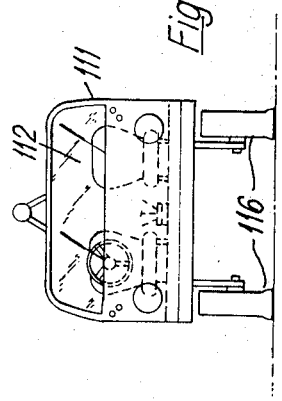

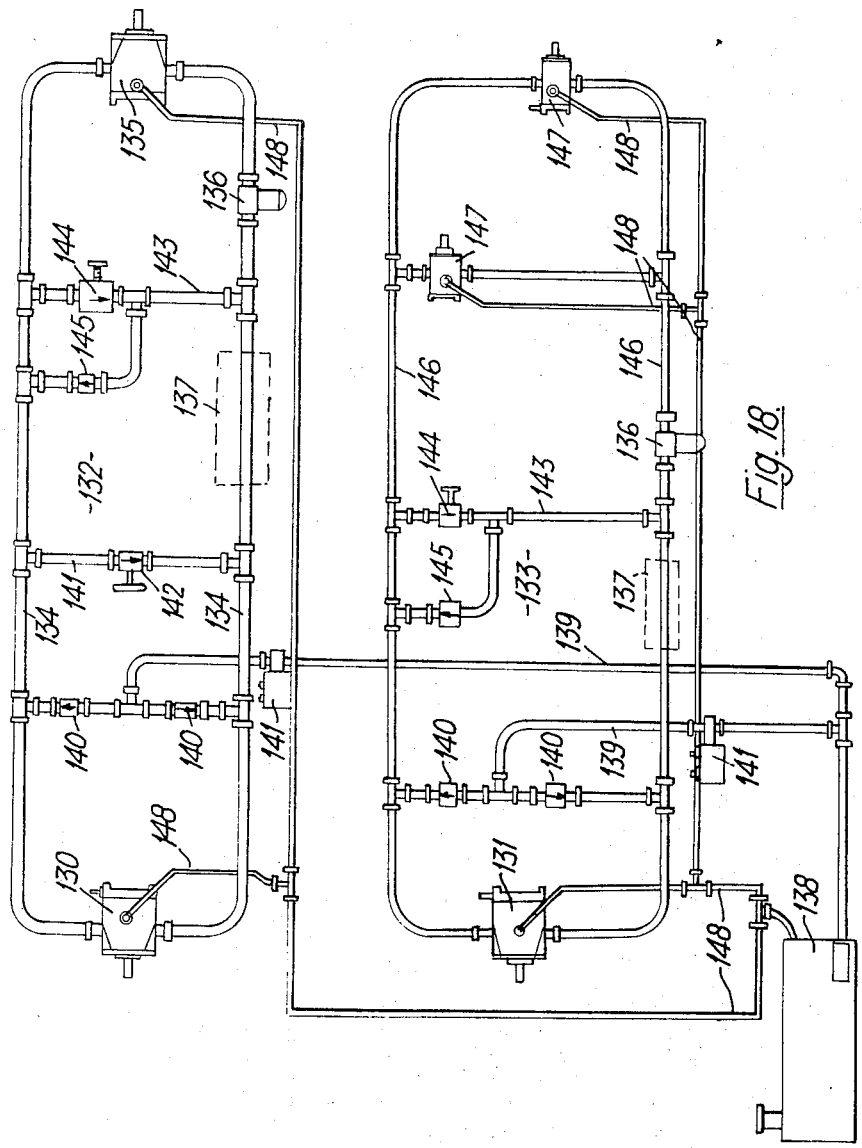

AIR-CUSHION SUPPORTED VEHICLES

This invention relates to air cushion or ground effect vehicles, also known as hovercraft, which can travel supported on a cushion of air maintained beneath the vehicle.

Much development work has already been done on such vehicles but it has been directed to producing large and very costly craft for operation over water. Little effort seems to have been expended on the problems involved in designing comparatively small vehicles, and especially vehicles for the land or dual land-/water role. at an economical cost. It is an object of this invention to make the commercial utilisation of hovercraft, and especially machines of smaller type, a more attractive and economical proposition.

According to the present invention, an air cushion vehicle is provided wherein at least the principal, and preferably all, of the various units needing power drive are driven from a common prime mover or movers via a hydrostatic system or systems. This not only reduces the machinery required, with consequent reduction in cost and weight penalty, but also it allows the heavy units to be placed where the designer wishes, having regard to the efficiency of their functioning and the centre of gravity of the vehicle, without complicating the drive arrangements.

In one form, the vehicle may have a main section with ground wheels, and one or more retractible or folding or inflatable sponsons that can be lowered to increase the air cushion area in the lower mode and lifted to decrease the overall area occupied by the vehicle, and especially its width, when it is operating on its wheels. Substantially all the machinery and services will be on the main section which will also carry the control cabin or cockpit extending the full width of this main section. The ground wheels may be retractible in the hover mode.

An alternative and particularly advantageous arrangement, however, provides an air-cushion-supported vehicle or hovercraft which comprises, in combination, a non-powered platform, fitted with either a permanent or a quickly-detachable air-retaining skirt, and a powered module built as a separate entity and removably docked or mounted on the non-powered platform, the non-powered platform being one from a supply of purpose-built platforms.

Whereas the air supply and propulsion equipment of a hovercraft represents the major capital expense, and some or all of this will be built into the powered module, the non-powered platforms may be comparatively inexpensive. Consequently, by providing a number of such platforms for use in conjunction with one, or a smaller number of powered modules, the turn-round time required at loading and unloading points can be greatly reduced or substantially eliminated so far as the expensive capital equipment is concerned, the powered module being kept in more or less constant employment on different platforms. Also, the advantageous possibility is presented of an operator possessing a variety of platforms for different purposes, such as dry freight transport, bulk-liquid transport, passenger carrying, crop-spraying, and so forth, all of which can, when selected for duty, be powered by the same module. The advantages of this, especially for charter operators, are therefore very clear.

It will be understood that the expression "non-powered platform" means only that the platform, when apart from the powered module, does not bear the major power unit or units of the vehicle; it does not exclude the possibility of the platform carrying auxiliary power units, such as auxiliary motors, pumps and the like, for special purposes, or indeed the lift fan or fans and propulsion fans or propellers if these can be conveniently coupled to the main power unit on the module.

In the preferred arrangement, the air-cushion-retaining peripheral skirt is attached by quick-fastening means, such as one or more heavy duty sliding clasp fasteners to make replacement a simple matter in the event of damage. There may also be individually inflatable curtains within the peripheral skirt, to sub-divide the cushion area and promote stability.

As another preferred feature, the cooling radiator for the prime mover, and/or other heat exchange means for fluid to be cooled is disposed in the air cushion supply air flow so that the heat abstracted warms the cushion air and efficiency is thereby promoted.

Figure 2:
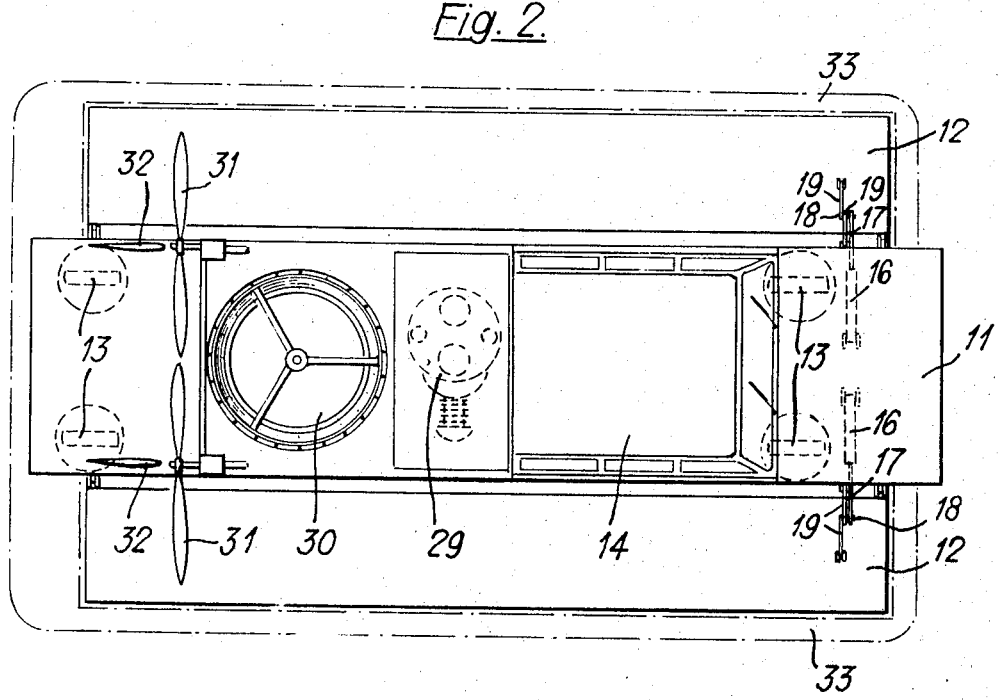
Figure 3:
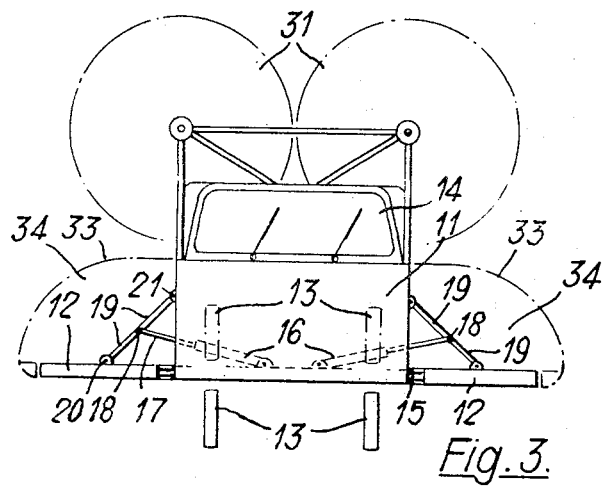
Figure 4:
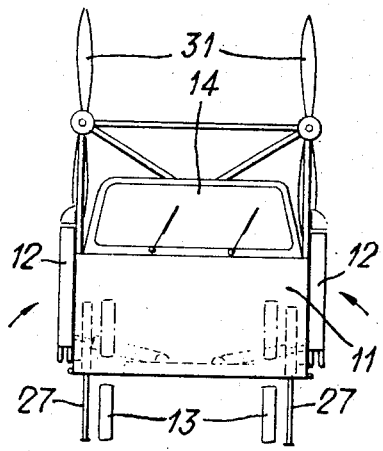
Figure 5:
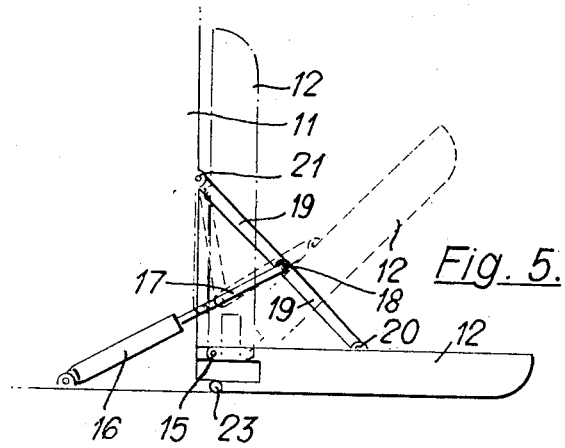
Figure 6:
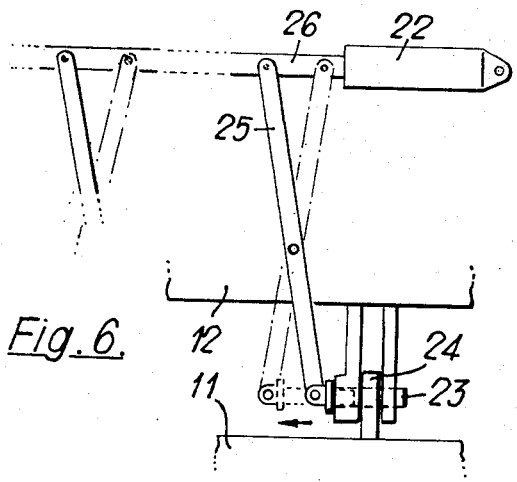
Figure 7:
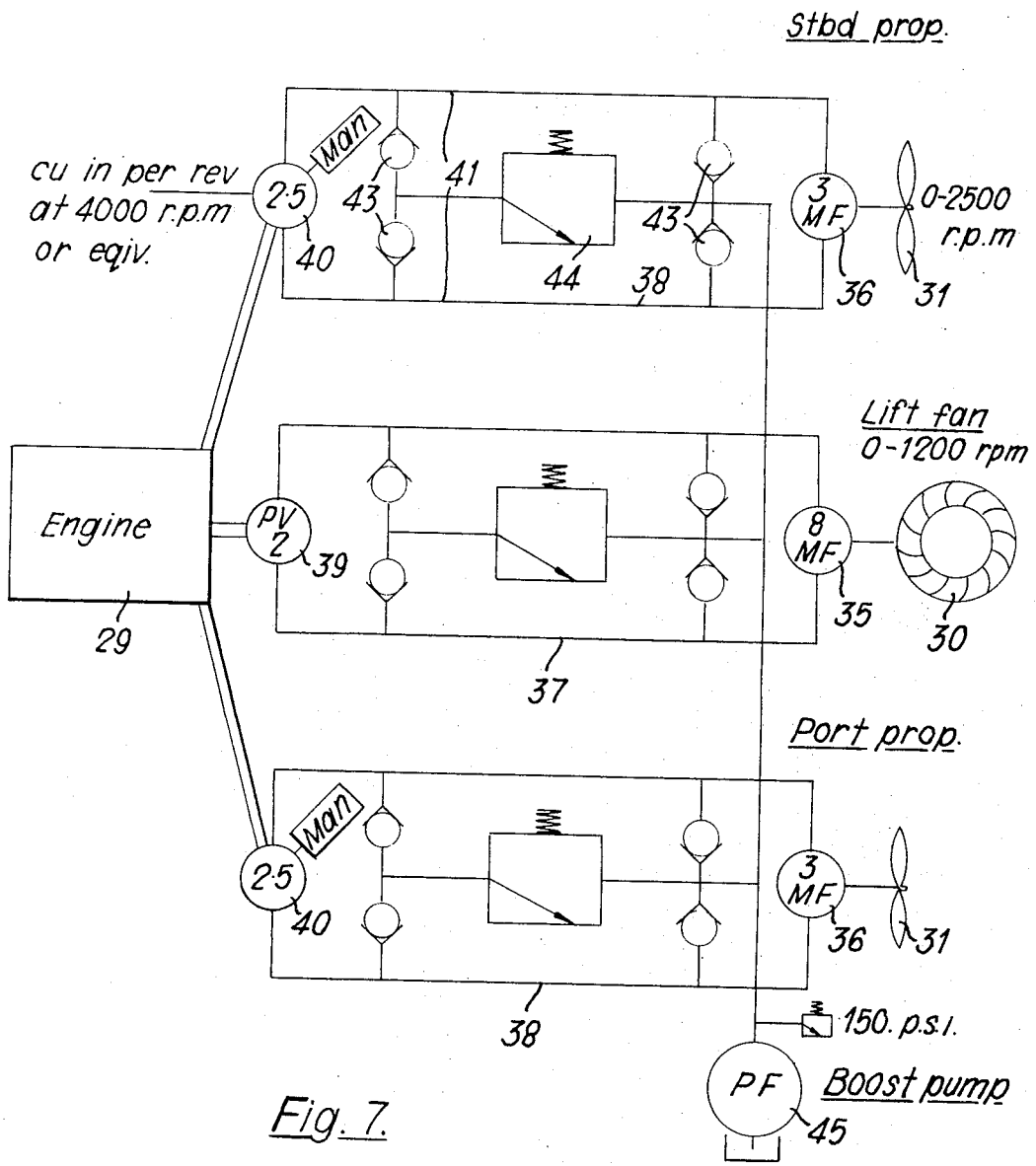
Figure 8:
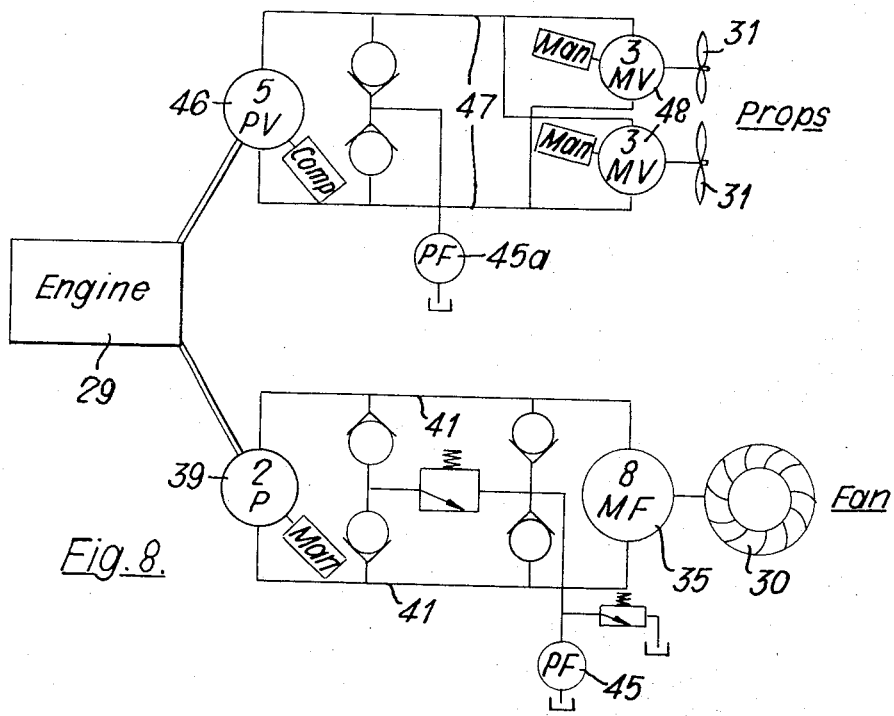
Figure 9:
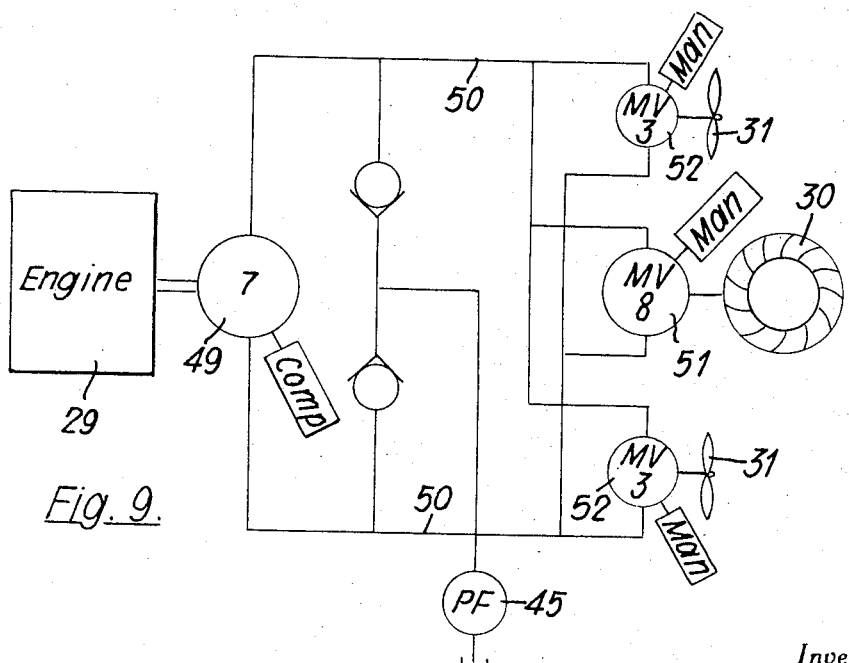
Figure 10:
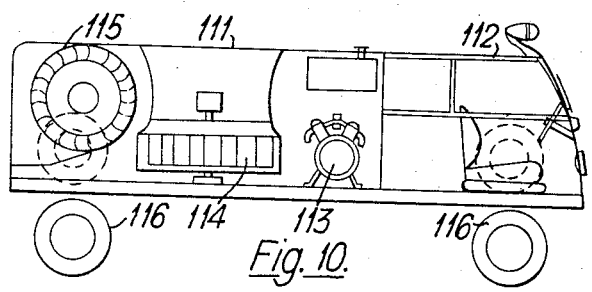
Figure 11:
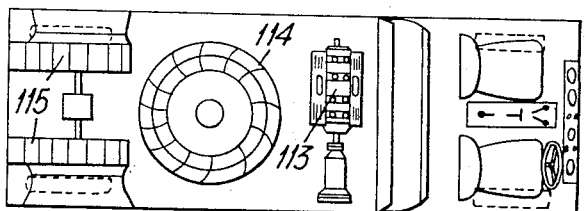
Figure 15:
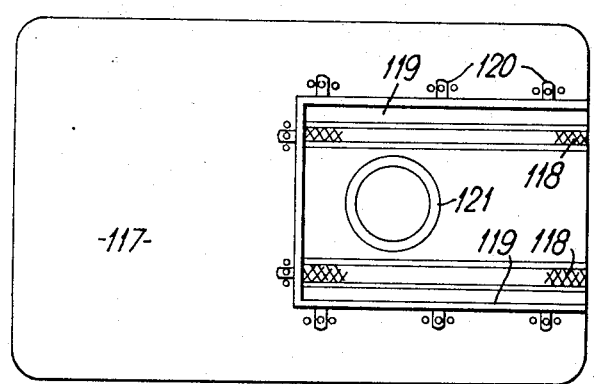
Figure 17:
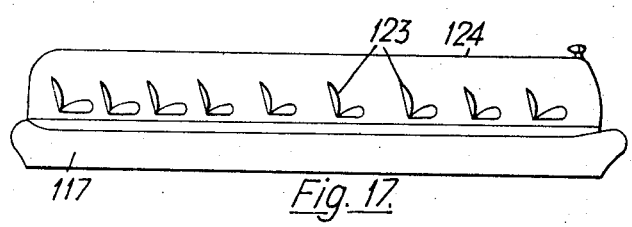
Figure 13:
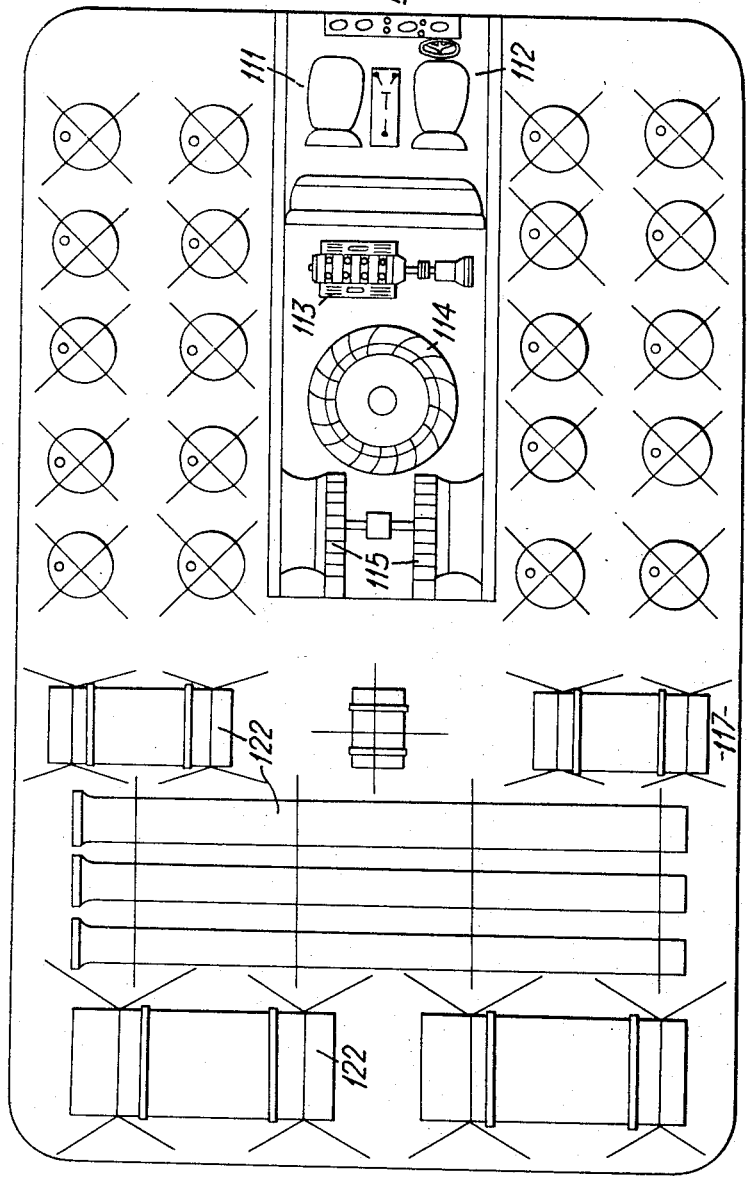

The above and other features will be apparent in the following description of arrangements in accordance with the invention, given by way of example and with reference to the accompanying diagrammatic drawings, in which:

FIG. 1 is a view of one form of ground effect vehicle or hovercraft in longitudinal section, FIG. 2 is a plan of the vehicle, FIG. 3 is a front elevation, FIG. 4 is a front elevation of the vehicle with side sponsons folded, FIG. 5 shows, in elevation, detail of folding means for the sponsons, FIG. 6 shows, in plan, detail of locking arrangements for the sponsons, FIGS. 7, 8 and 9 are diagrams illustrating three different hydrostatic systems for powering the vehicle, FIGS. 10, 11 and 12 are, respectively, a side elevation, a plan and a front elevation of a powered module of another form of hovercraft, FIGS. 13 and 14 are, respectively, a plan and a side elevation showing the powered module combined with a non-powered platform, FIGS. 15 and 16 are a plan and front elevation of the non-powered platform illustrating the means of docking thereon the powered module, FIG. 17 is an elevation of an alternative form of non-powered platform, and FIG. 18 is a piping diagram showing the layout of one form of hydrostatic drive.

The vehicle shown in FIGS. 1 to 4 has a main central section 11 and two lateral sponsons 12 hinged on the main section at either side. In FIGS. 2 and 3 sponsons 12 are seen extended to form side extensions of the central section while in FIG. 4 they are raised into a vertical position. The centre section has retractable ground wheels 13. With the sponsons down a large area beneath the vehicle is presented for support of the vehicle by means of an air cushion. With the sponsons folded up the vehicle becomes much narrower and is able to travel along roads on its ground wheels, or perhaps along canals. Preferably, at least one pair of the ground wheels 13 is steerable, a steering wheel being provided in the vehicle cabin 14; and either one or both pairs of ground wheels are power driven.

The sponsons 12 are hinged on the centre section 11 at 15 and are raised and lowered under the control of jacks 16 pivotally mounted on the centre section which have their jack rods 17 coupled to the intermediate hinge joints 18 of pairs of articulated links 19 extending between pivotal connections 20, 21 on the sponsons and the sides of the centre section 11, respectively. FIG. 5 shows how the sponsons are raised by contraction of the jacks 16 after locking pins 23 at positions below the sponson hinge points 15 have been withdrawn to allow the sponsons to swing upward. The locking pins 23 may be operated by any suitable mechanical, hydraulic, pneumatic or other means. FIG. 6 illustrates one arrangement in which the pins 23, engaged in lugs 24 on the centre section 11 when the sponsons 12 are down, are withdrawn by swinging levers 25 coupled to rods 26 that extend longitudinally of the sponsons 12 and are operated by jacks 22. It will be understood that, although only a single pair of sponson-folding jacks 16 and associated links 19 is shown in FIG. 2, there may be one or more further pairs at other positions along the vehicle.

The retraction and lowering of the ground wheels 13 may also be effected by means of jacks. In addition to the ground wheels, four extensible legs or props 27 may be provided on the centre section to support the vehicle at its corners and enable a transporter platform to be placed under the vehicle while the wheels are raised.

To retain the supporting cushion of air under the vehicle in the ground effect or hovering mode of operation, a flexible depending skirt 28 is provided all around the vehicle (FIG. 1). This peripheral skirt may take any one of a number of known forms; it may, if desired, be arranged so that at least the side portions of it can be stored folded between the sponsons 12 and the sides of the centre section 11 when the sponsons are raised. Preferably, the skirt, or sections thereof, are adapted for quick attachment to and detachment from the vehicle to facilitate repair and replacement. Heavy duty sliding clasp fasteners are very suitable for this purpose, one stringer of the fastener being secured more or less permanently around the body of the vehicle while the other co-operating stringer extends along the edge of the skirt that is to be attached to the vehicle. Thus, it is possible to remove and replace the skirt without interfering with the permanent fastenings.

The cushion area within the skirts 28 may advantageously be divided into a plurality of sub-areas by the provision of individually inflated inner curtains or petticoats. This is to improve the stability of the vehicle in the hover mode. These inner curtains may either be arranged for inflation by the cushion air supply or be pre-inflated by external means. Each area-defining skirt or curtain, although nominally continuous without gaps, may nevertheless be made in a number of separable sections with the view to minimising damage if an obstruction is encountered during travel of the vehicle. The separable sections can deflect individually and move apart to make it easier for the obstruction to be negotiated.

As in the case of the peripheral skirt, any inner curtains or petticoats may likewise be attached by quick-action fastening means such as sliding clasp fasteners. And the whole skirt assembly should be such that it will fold beneath the vehicle without damage when the vehicle sets down on either water or land.

The power unit of the vehicle is an internal combustion engine 29, or gas or steam turbine, situated centrally behind the cabin 14. Immediately behind this is a lift fan 30, mounted with its rotor axis vertical, to supply the cushion air. Propulsion in the hover mode is by twin propellers 31 at the rear of the vehicle. Twin rudders 32 are placed one immediately behind each propeller. It will be noted that all this machinery is on the centre section 11 of the vehicle, and that when the sponsons 12 are folded and the propellers 31 are at rest in the vertical position (FIG. 4) there is substantially no projection of the vehicle laterally beyond the centre section 12 or the cabin 14.

Preferably, the mechanical drive to the cushion air fan 30 includes, as the final drive component next the fan rotor, a free-wheel or like overrun mechanism. This has the advantage that, in the event of a stoppage of the fan drive, the fan rotor will run on and thus the decay of the air cushion will be delayed. The fan motor is also protected. A similar mechanism may be provided to protect each of the propellers 31.

It is also advantageous to provide a heat exchanger or radiator, e.g. of gilled or other cooling tube construction, situated in the lift fan air flow, either on the inlet or the outlet side of the fan. Engine cooling water, engine oil, hydraulic or other warm fluid is passed through this heat exchanger so that the cushion air is heated and the liquid passed through is cooled. This increases efficiency.

The sponsons 12, when extended, serve not only to increase the air cushion area but also the buoyancy of the vehicle, in the event that it sets down on water. Thus, flexible side walls 33 connect the outer edges of the sponsons 12 to the upper parts of the sides of the centre section 11 to create buoyancy cavities 23 that fill with cushion air. If desired, an outboard motor can be provided to propel the vehicle in the water-borne mode.

The power drive from the prime mover 29 to the lift fan 30, propellers 31 and so forth is transmitted by a hydrostatic system. This gives many advantages, including freedom in regard to the positioning of the various units, which affects the vehicle centre of gravity, reductions in the number of power units, better control facilities, and reduced vibration and noise. In the arrangement of FIG. 7, the lift fan 30 and the two propellers 31 are driven by three individual fixed displacement hydraulic motors 35, 36 supplied through three separate hydraulic circuits 37, 38. The engine 29 is coupled, by shafting or other means, to drive three individual hydraulic pumps 39, 40, one in each circuit 37, 38. The hydraulic circuits 37, 38 otherwise each comprise twin feed lines 41 between the pump 39 or 40 and the motor 35 or 36, and connections to a common supply line 42 via non-return valves 43 and a pressure relief valve 44, the common supply line being initially pressurised to a low level, said 150 p.s.i., by a boost pump 45. The motor operating pressures will be much higher than this, say in the range 1,500 to 5,000 p.s.i. The pumps 39, 40 all have variable displacement and may, for example, be variable displacement swash plate pumps. Each of the pumps 40 in the propeller circuits is controllable manually by means of an individual pilot's control in the cabin; the control of the lift fan circuit pump 39 may be either manual or by means of an automatic governor system to maintain a substantially constant fan speed.

In the system of FIG. 8, the lift fan motor circuit is generally the same as in FIG. 7, with a manually-controlled pump 39. But the propeller motor circuits have been combined for supply by a common governor-controlled pump 46 via common feed lines 47, and with a separate supply boost pump 45a. Instead of being fixed displacement motors, the propeller motors are now variable displacement motors 48 controlled manually from the cabin, e.g. swash plate motors. An alternative is to have two fixed displacement motors and effect differential control of the supplies thereto by means of a manually-operated distribution valve.

IN FIG. 9, all three motors for the lift fan and propellers are supplied from a single governor-controlled pump 49 through common feed lines 50, the lift fan motor 51 and each of the propeller motors 52 being variable displacement motors controlled manually from the cabin. Again, manually-operated distributors can be employed instead of variable displacement motors.

While in the systems illustrated in FIGS. 7, 8 and 9 only the drives to the lift fan and propellers are considered, it will be understood that further hydraulic circuits may supply power to the various jacks, to individual motors for driving the ground wheels 13, to an outboard motor, and indeed to any and all units on the vehicle requiring power, so that one single prime mover suffices for all services.

Referring now to FIGS. 10 to 17 of the drawings, FIGS. 10 to 12 are three views of the powered module for a further design of ground effect vehicle or hovercraft, FIGS. 13 and 14 show this module in operative association with a freight-carrying platform, FIGS. 15 and 16 show the layout of the platform enabling it to receive the powered module, and FIG. 17 illustrates a passenger-carrying platform.

The powered module 111 comprises a cabin 112 with crew accomodation, an engine 113 with drive transmission systems to a lift fan 114 providing air cushion air and propellers or propulsion fans 115, fuel tanks and all necessary control systems. The module 111 also has retractable ground wheels 116 or tracks, some or all of which are driven. All the drive systems are hydrostatic as herein described.

To enable the power module to be combined with a selected platform 117, the platform may be provided at its front or rear end with a ramp or ramps 118 or the like leading on to the area of the platform that is to receive the module. After the module 111 has been driven on to the platform its wheels may be retracted and the two units become locked together. Appropriate docking guides 119 and clamps 120 may be provided to ensure that, during this operation, the module 111 is automatically aligned correctly with the platform and then quickly locked to it. The reverse operation of removing the powered module 111 may be performed just as readily, the module being unclamped and rising on its lowered wheels after which it can be driven off.

The air delivery duct from the lift fan 114 on the powered module 111 leads to an opening in the base of the module, and this opening comes into register with a corresponding opening 121 on the platform when the module is docked on the platform. Operation of the lift fan thereafter supplies air to the air cushion zone under the platform 117 through the opening 121.

As will be observed, the platform when loaded carries freight 122 on the areas behind (or in front) and on either side of the powered module 111, thereby achieving a balanced distribution of the weight of the whole craft. Alternatively, the powered module could be docked at a central position on the platform, which location might be more appropriate in the case of, for instance, a passenger-carrying vehicle. If the platform is equipped with passenger seating 123 this will be conveniently enclosed in a cabin 124 as shown in FIG. 17.

Whereas it is contemplated that the lift fan and propulsion fans or propellers will usually be mounted on the powered module as described, in the case of larger machines especially it may in certain cases be more advantageous to place these on the non-powered platform together with their associated hydrostatic motors and control gear. Rapid connection could then be made to the main power unit or units on the powered module by means of appropriate pressure lines and quick-release pipe or hose couplings.

Referring now to FIG. 18, this shows the piping details of one preferred form of hydrostatic drive. The prime mover (not shown) drives two servo-controlled pumps 130, 131 serving, respectively, the cushion fan hydrostatic supply system 132 and the propeller drive system 133. Supply and return lines 134 run from the pump 130 to the cushion fan drive motor 135 and include a filter 136 and, if desired, a cooler 137. The system 132 is kept replenished with oil from a supply tank 38 via a feed pipe 139 and non-return valves 140, a boost pump 141 being fitted if needed. The two lines 134 are connected by a bypass 141 including a shut-off valve 142 which can be opened for starting up. A second bypass 143 contains a relief valve 144 with a connection leading back from the low pressure side of this valve to the high pressure line via a non-return valve 145.

The propeller drive system 133 has supply and return lines 146 to which the two propeller motors 147 are connected in parallel. The other connections and components of this system are the same as for the cushion fan system 132 and are therefore given like reference numerals. Bleed lines 148 lead any leakage past the seals of the pumps and motors of both systems back to the supply tank 138.

Many and considerable modifications of the arrangements described and illustrated are, of course, possible without departing from the scope of the invention. For instance, while symmetrical lateral sponsons are proposed in the first vehicle described herein, other layouts may be designed in which one or different numbers of sponsons are fitted, not necessarily symmetrically.

We claim:

1. A vehicle, wherein at least the principal amongst the various units needing power drive are driven from a common prime mover via a hydrostatic system, and comprising, in combination, a substantially non-powered platform fitted with a peripheral air-cushion retaining skirt, and a powered module built as a separate land vehicle and removably docked on the non-powered platform, said powered module when so docked occupying only a minor proportion of the plan area of said platform and providing sufficient power to enable said platform to transport, in addition to said powered module, a payload on the remaining major area thereof; and wherein said powered module is provided with ground wheels and carries the prime mover and substantially all of the units supplied with power thereby; and wherein the powered module is itself an A.C.V. and is provided with retractable sponsons which can be lowered to increase the air cushion area thereof and raised to reduce the plan area of the powered module when it is supported by its wheels.

2. A vehicle according to claim 1, wherein the sponsons are operated by hydraulic jacks.

3. A vehicle according to claim 1, wherein the sponsons have power-operated rectrictible locks.

4. A vehicle according to claim 1, wherein the sponsons are arranged to increase not only the ground area but also the buoyancy of the powered module, when lowered.

5. A vehicle according to claim 1, provided with an outboard marine propulsion unit powered by a hydrostatic fluid motor.

6. A vehicle, wherein at least the principal amongst the various units needing power drive are driven from a common prime mover via a hydrostatic system, and comprising in combination, a substantially non-powered platform fitted with a peripheral air-cushion retaining skirt, and a powered module built as a separate land vehicle and removably docked on the non-powered platform, said powered module when so docked occupying only a minor proportion of the plan area of said platform and providing sufficient power to enable said platform to transport, in addition to said powered module, a payload on the remaining major area thereof; and wherein said powered module is provided with ground wheels and carries the prime mover and substantially all of the units supplied with power thereby; and wherein the ground wheels are driven by individual hydrostatic fluid motors.

7. A vehicle according to claim 6, wherein the ground wheels are retractible.

8. A vehicle according to claim 6, wherein the air cushion is sub-divided by individually-inflatable flexible curtains, lying within the area bounded by said peripheral air-cushion-retaining skirt.

9. A vehicle according to claim 6, wherein the powered module has the prime mover disposed about midway along it, with the behind the prime mover a lift fan to supply the cushion air, in front of the prime mover is a cabin extending substantially the full width of said powered module, and aft of the fan are two side-by-side propulsion units for propelling the vehicle at least in the hover mode.

10. A vehicle according to claim 6, wherein a hydrostatic fluid motor driving a lift fan supplying the cushion air, and motors individually driving one or more propellers for propelling the vehicle at least in the hover mode, are all supplied from a common pump driven by the prime mover.

11. A vehicle, wherein at least the principal amongst the various units needing power drive are driven from a common prime mover via a hydrostatic system, and comprising, in combination, a substantially no-powered platform fitted with a peripheral air-cushion retaining skirt, and a powered module built as a separate land vehicle and removably docked on the non-powered platform, said powered module when so docked occupying only a minor proportion of the plan area of said platform and providing sufficient power to enable said platform to transport, in addition to said powered module, a payload on the remainng major area thereof; and wherein the final mechanical drive to a lift fan supplying the cushion area comprises a free-wheel overrun mechanism next the fan rotor.

12. A vehicle, wherein at least the principal amongst the various units needing power drive are driven from a common prime mover via a hydrostatic system, and comprising, in combination, a substantially non-powered platform fitted with a peripheral air-cushion retaining skirt, and a powered module built as a separate land vehicle and removably docked on the non-powered platform, said powered module when so docked occupying only a minor proportion of the plan area of said platform and providing sufficient power to enable said platform to transport, in addition to said powered module, a payload on the remaining major area thereof; and wherein a cooling water radiator for the prime mover is disposed in the air flow being delivered to the cushion area, thereby heating the cushion of air.

13. A vehicle, wherein at least the principal amongst the various units needing power drive are driven from a common prime mover via a hydrostatic system, and comprising, in combination, a substantially non-powered platform fitted with a peripheral air-cushion retaining skirt, and a powered module built as a separate land vehicle and removably docked on the non-powered platform, said powered module when so docked occupying only a minor proportion of the plan area of said platform and providing sufficient power to enable said platform to transport, in addition to said powered module, a payload on the remaining major area thereof; and wherein a hydrostatic fluid motor driving a lift fan supplying the cushion air, and motors individually driving propellers for propelling the vehicle at least in the hover mode, are supplied through separate hydrostatic circuits in which there is one pump driven by the prime mover to supply the lift fan motor and at least one other pump to supply the propeller motors; and wherein, in respect of each motor supply pump combination, at least one has variable displacement.

14. A vehicle according to claim 13, wherein the propeller motors are supplied through separate circuits by separate pumps.

15. A vehicle, wherein at least the principal amongst the various units needing power drive are driven from a common prime mover via a hydrostatic system, and comprising, in combination, a substantially non-powered platform fitted with a peripheral air-cushion retaining skirt, and a powered module built as a separate land vehicle and removably docked on the non-powered platform, said powered module when so docked occupying only a minor proportion of the plan area of said platform and providing sufficient power to enable said platform to transport, in addition to said powered module, a payload on the remaining major area thereof; and wherein a hydrostatic fluid motor driving a lift fan supplying the cushion air, and motors individually driving propellers for propelling the vehicle at least in the hover mode, are supplied through separate hydrostatic circuits in which there is one pump driven by the prime mover to supply the lift fan motor and at least one other pump to supply the propeller motors; and wherein the propeller motors are supplied from a common pump; and wherein each of the motors supplied by a common pump has variable displacement.

16. A land vehicle constituted as an A.C.V., comprising a prime mover and hydraulic circuits whereby at least the principal amongst the various units of the vehicle needing power drive are driven in common from said prime mover via a hydrostatic system, and further comprising ground wheels and retractable sponsons, with means to lower said sponsons to increase the air cushion area of the vehicle when operating in the A.C.V. mode and to raise said sponsons to reduce the plane area of the vehicle when it is supported by said ground wheels.

17. A land vehicle constituted as an A.C.V., comprising a prime mover and hydraulic circuits whereby at least the principal amongst the various units of the vehicle needing power drive are driven in common from said prime mover via a hydrostatuc system, and further comprising a lift fan supplying the cushion air and a hydrostatic fluid motor driving said lift fan, propellers for propelling the vehicle at least in the A.C.V. mode, respective motors individually driving said propellers, and separate hydraulic circuits in which there is one pump driven by said prime mover to supply said lift fan motor and at least one other pump to supply said propeller motors; and wherein, in respect of each motor/supply pump combination, at least one has variable displacement.

18. A land vehicle constituted as an A.C.V., comprising a prime mover and hydraulic circuits whereby at least the principal amongst the various units of the vehicle needing power drive are driven in common from said prime mover via a hydrostatic system, and further comprising a lift fan supplying the cushion air and a hydrostatic fluid motor driving said lift fan, propellers for propelling the vehicle at least in the A.C.V. mode and respective motors individually driving said propellers, and separate hydraulic circuits in which there is one pump driven by said prime mover to supply said lift fan motor and at least one other pump to supply said propeller motors; and wherein said propeller motors are supplied from a common pump; and wherein each of the motors supplied by a common pump has variable displacement.

* * * * *